(12) United States Patent
Michimura et al.

(10) Patent No.: US 10,437,613 B2
(45) Date of Patent: Oct. 8, 2019

(54) IMAGE FORMING APPARATUS AND NON-TRANSITORY COMPUTER READABLE MEDIUM

(71) Applicant: FUJI XEROX CO., LTD., Tokyo (JP)

(72) Inventors: Tadao Michimura, Kanagawa (JP); Masao Morita, Kanagawa (JP); Masanori Satake, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/644,841

(22) Filed: Jul. 10, 2017

(65) Prior Publication Data

US 2018/0143843 A1 May 24, 2018

(30) Foreign Application Priority Data

Nov. 18, 2016 (JP) ................. 2016-225300

(51) Int. Cl.
  *G06F 3/12* (2006.01)
  *G06F 9/451* (2018.01)
  *H04L 29/08* (2006.01)
  *H04L 12/28* (2006.01)
  *H04N 1/00* (2006.01)
  *G06F 8/38* (2018.01)

(52) U.S. Cl.
  CPC ............ *G06F 9/451* (2018.02); *G06F 8/38* (2013.01); *H04L 12/28* (2013.01); *H04L 69/321* (2013.01); *H04L 69/328* (2013.01); *H04N 1/00408* (2013.01); *H04N 2201/0082* (2013.01); *H04N 2201/0094* (2013.01)

(58) Field of Classification Search
  CPC ....... G06F 9/451; H04L 12/28; H04L 69/328; H04N 1/00408; H04N 2201/0082; H04N 2201/0094
  See application file for complete search history.

(56) References Cited

U.S. PATENT DOCUMENTS

| | | | |
|---|---|---|---|
| 2007/0185753 A1* | 8/2007 | Shimmoto | G06Q 10/06315 705/7.25 |
| 2012/0023451 A1 | 1/2012 | Kuroyanagi | |
| 2016/0117594 A1* | 4/2016 | Perez Ramos | G06N 5/04 706/14 |
| 2016/0171479 A1* | 6/2016 | Prakash | H04W 4/70 705/44 |

FOREIGN PATENT DOCUMENTS

| | | |
|---|---|---|
| JP | 2003-323093 | 11/2003 |
| JP | 2003-333241 | 11/2003 |
| JP | 2012-027662 | 2/2012 |
| JP | 2012-248102 | 12/2012 |

* cited by examiner

*Primary Examiner* — Moustapha Diaby
(74) *Attorney, Agent, or Firm* — JCIPRNET

(57) ABSTRACT

An image forming apparatus includes a non-transitory computer readable medium storing a program, the program being logically divided into a presentation layer that implements a user interface function of realizing a response from a user, a device service layer that controls a device in response to a call from the presentation layer and makes a notification to the presentation layer, and a base layer that makes the presentation layer and the device service layer cooperate with each other; and a controller that executes the program.

19 Claims, 14 Drawing Sheets

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-225300 filed Nov. 18, 2016.

BACKGROUND

Technical Field

The present invention relates to an image forming apparatus and a non-transitory computer readable medium.

SUMMARY

Meanwhile, in image forming apparatuses (or a multi-function machine) having functions such as copy, print, and fax, in addition to providing image input and output functions, coping with various device configurations and environments, high-quality user interaction, function aggregation, providing integrated services, and service cooperation are required, and it is difficult to ensure maintainability, expandability, safety, and development productivity in the design and implementation as embedded software in the related art. Further, in the function division and aggregation using libraries in the related art, since many pieces of runtime information are shared, division becomes insufficient.

According to an aspect of the invention, there is provided an image forming apparatus including a non-transitory computer readable medium storing a program, the program being logically divided into a presentation layer that implements a user interface function of realizing a response from a user, a device service layer that controls a device in response to a call from the presentation layer and makes a notification to the presentation layer, and a base layer that makes the presentation layer and the device service layer cooperate with each other, and a controller that executes a program.

BRIEF DESCRIPTION OF THE DRAWINGS

Exemplary embodiments of the present invention will be described in detail based on the following figures, wherein:

FIG. 9 is a sequence diagram after the power supply is turned on;

FIG. 10 is a detailed sequence diagram after the power supply is turned on;

DETAILED DESCRIPTION

Hereinafter, exemplary embodiments of the present invention will be described based on the drawings.

Entire System Configuration

Figure 1:
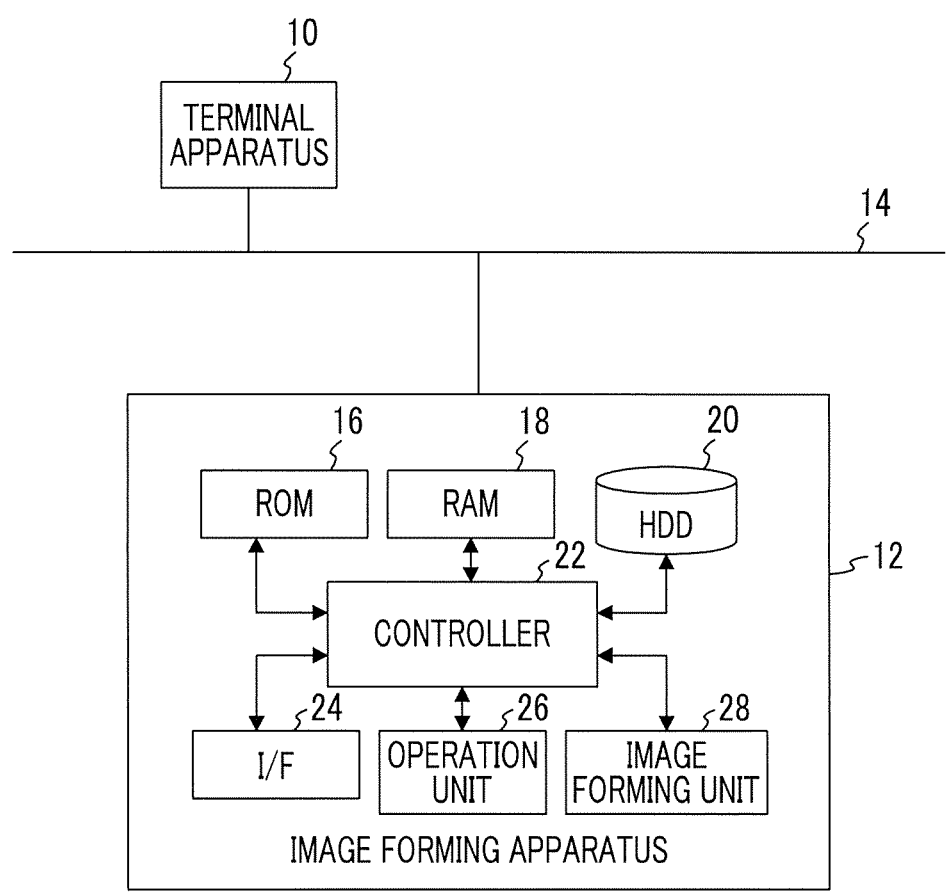
FIG. 1 is a functional block diagram of an image forming apparatus according to an exemplary embodiment.

FIG. 1 is a configuration block diagram of an image forming system including an image forming apparatus according to the present exemplary embodiment. The image forming system includes a terminal apparatus 10, and an image forming apparatus 12. The terminal apparatus 10 and the image forming apparatus 12 are connected through communication unit 14. As the communication unit 14, for example, a data communication network such as a local area network (LAN) is used.

The terminal apparatus 10 is connected to the image forming apparatus 12 through the communication unit 14, and transmits a print job or the like including a print instruction of a document according to a user's instruction.

The image forming apparatus 12 includes a ROM 16, a RAM 18, an HDD 20, a controller 22 including one or more CPUs, an input/output interface I/F 24, an operation unit 26 such as a touch panel, and an image forming unit 28.

According to the processing program stored in the ROM 16, the controller 22 including one or plural CPUs receives a print job command or the like from the terminal apparatus 10 through the input/output I/F 24, interprets the PDL data to generate intermediate data, and further generates drawing data (raster data) from the generated intermediate data. Further, the controller 22 executes various commands such as Copy, Scan, and Fax, which are received from the operation unit 26.

The image forming unit 28 includes a print module, a scanner module, a fax module, a paper feed module, a document feed module, and an image processing accelerator.

The print module is a module having a function of marking an image on paper. For example, the print module has a known inkjet-type configuration, and prints drawing data on paper. A liquid or melted solid ink is ejected from a nozzle or the like, and recording is performed on paper, film, or the like. A method of ejecting ink includes a drop-on-demand method (a pressure pulse method) in which ink is ejected using electrostatic attraction, a thermal ink jet method in which ink is ejected using pressure generated by forming and growing bubble by high heat, and the like. The recording head includes, for example, a head that ejects cyan ink, a head that ejects magenta ink, a head that ejects yellow ink, and a head that ejects black ink, and a line head of which width is at least equal to the width of paper is used. An ink droplet of each color is ejected and recorded onto an intermediate transfer member by the recording head, and thereafter, the ink droplet is transferred to a sheet and printed.

The scanner module is a module that reads an image on the paper and converts the image into digital data.

The fax module includes an image processing module for a modem or a fax, and is used to execute a fax function.

The paper feed module is used to convey paper from a paper tray to the print module.

The document feed module is used to convey paper from a document tray to the scanner module.

The image processing accelerator is a module that performs compression and decompression processes in conjunction with the scanner module or the like. The image processing accelerator is not mandatory, and may be an optional module.

In addition to the above, the image forming apparatus 12 may also include a finisher that performs punching and sorting of paper, an authentication unit which is configured with a USB, an IC card reader, or the like to authenticate a user, a billing unit, a human sensor, or a face camera, or the like.

Further, the image forming apparatus 12 may be connected to the Internet through the communication unit 14, and may have Ethernet (registered trademark) or WiFi.

Logical Configuration of System

Figure 2:
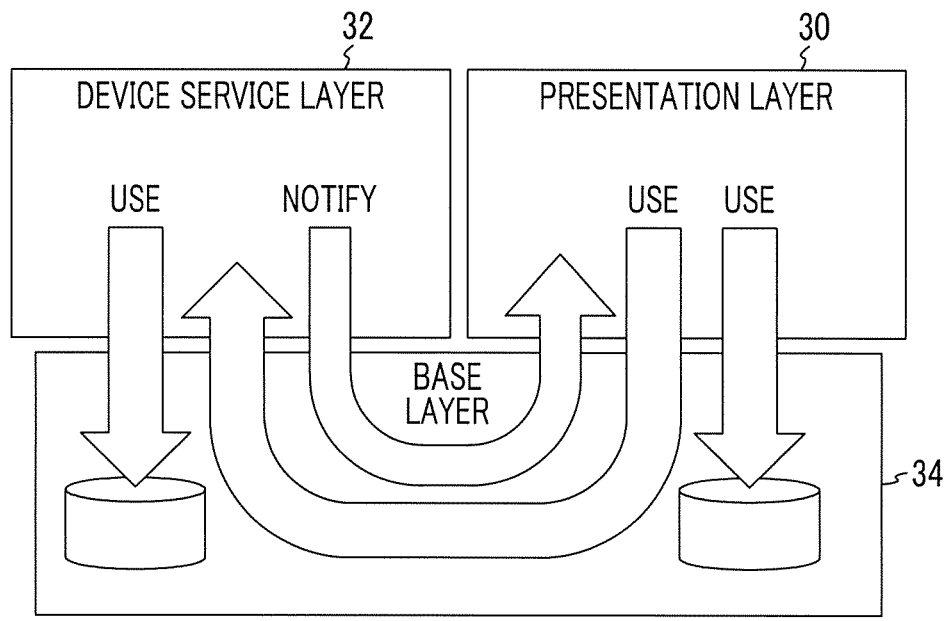
FIG. 2 is an explanatory diagram of logical division of a system.

FIG. 2 shows a logical configuration of a system executed on the controller 22. The system is roughly divided into three layers: a presentation layer 30, a device service layer 32, and a base layer 34.

The presentation layer 30 is a layer that implements a user interface function enabling interactive use with a user, and is a single process. The single process indicates the execution context of a program sharing an address space.

The device service layer 32 is a layer that controls various devices and implements services functioning in response to procedural calls, without including a user interface, and is a single process.

The base layer 34 is a layer that provides specific functions such as communication control between modules, and basic technologies and extension methods independent of services and a user interface, and some parts are executed in the same process space as the presentation layer, while the other parts are executed in the same process space as the device service layer.

The presentation layer 30 and the device service layer 32 cooperate with each other through the base layer 34 to construct a system. The presentation layer 30 calls the function of the device service layer 32 and obtains the response. The device service layer 32 transmits asynchronous notifications to the modules of the presentation layer 30, the modules being previously registered. The presentation layer 30 and the device service layer 32 can perform schema definition and function implementation using the mechanism (such as plug-in) of the base layer 34.

Each layer will be described in more detail below.

Figure 3:
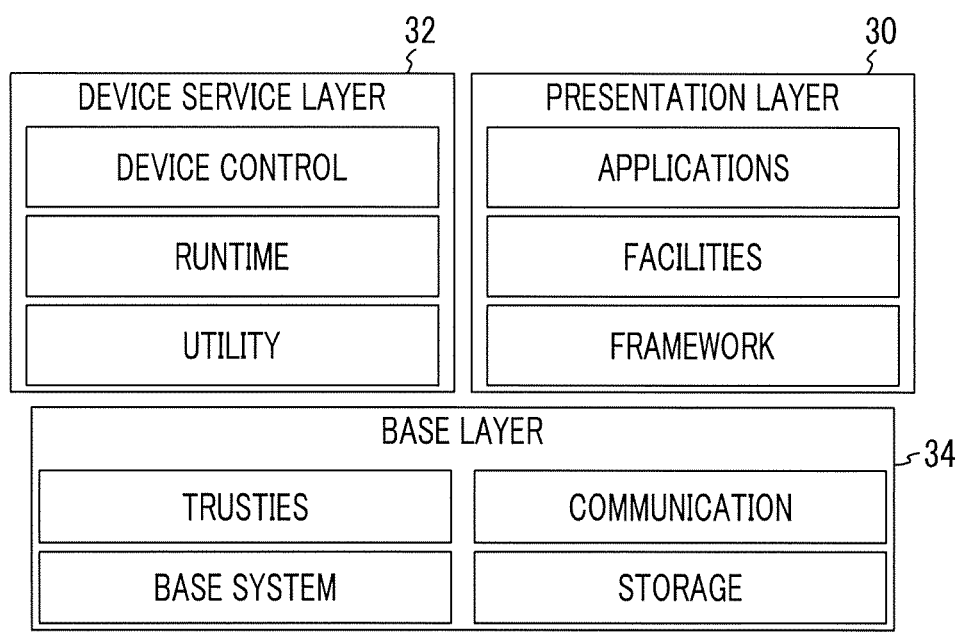
FIG. 3 is a detailed explanatory diagram of each layer.

FIG. 3 shows details of the presentation layer 30, the device service layer 32, and the base layer 34.

The presentation layer 30 includes Applications, Facilities, and Framework.

The Applications is a program that provides specific services such as copy, scan, and fax to a user through a user interface.

The Facilities is a program that constructs synchronous and asynchronous user interfaces that are to function as system premises, and provides functions which cooperate with other Applications, without depending on individual services.

The Framework is a program that defines common behaviors of Applications, and supports cooperation between Applications and implementation in the Applications.

The device service layer 32 includes Device Control, Runtime, and utility.

The Device Control is a program for controlling hardware devices such as a printer, a scanner, an image processing accelerator, and the like.

The Runtime is a program that models abstract concepts for operating, using, and auditing devices such as accounts, jobs, and documents, and provides a single function service such as copy, scan, and file transfer.

The utility is a program that provides services of multiple functions by combining the plural functions or adjusting parameters, by using functions in the Runtime. The base layer 34 includes Communication, Storage, Trusties, and Base System.

The Communication is a program that provides a mechanism of secure cooperation between the presentation layer 30 and the device service layer 32 and an extension method thereof.

The Storage provides a persistence mechanism such as a relational database and key value store (KVS), and an extension method thereof.

The Trusties is a program that gives maps, lists, and proofs for access control.

The Base System is a program that provides basic functions of a general operating system such as process control and communication between processes.

Figure 4:
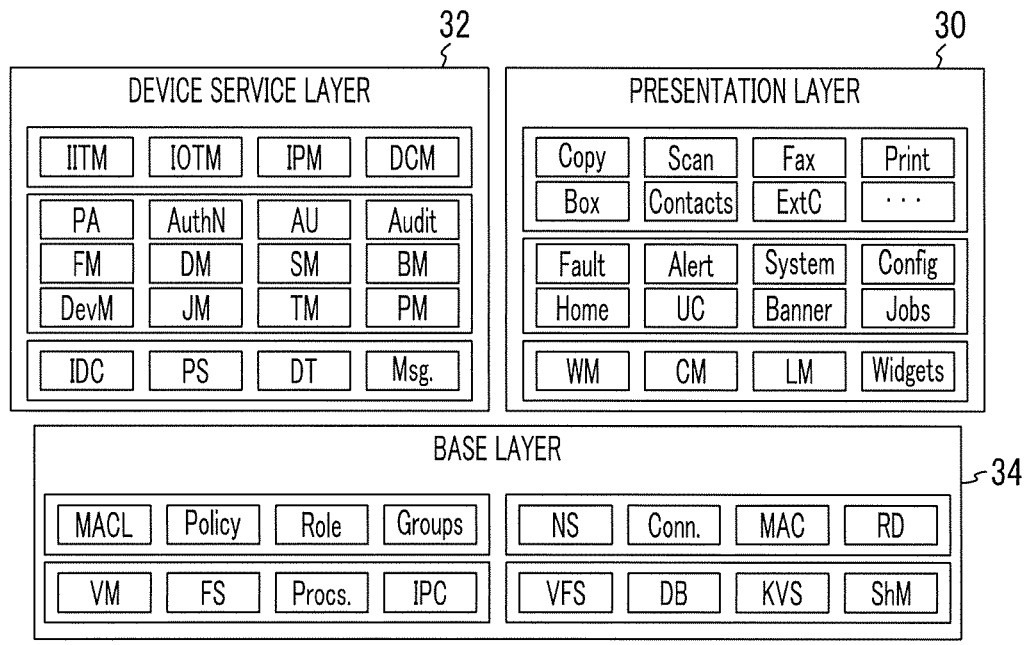
FIG. 4 is a more detailed explanatory diagram of each layer.

FIG. 4 shows further details of the presentation layer 30, the device service layer 32, and the base layer 34.

First, the Applications, the Facilities, and the Framework of the presentation layer 30 each include the following.

Applications

Copy: A program that realizes a service of printing images scanned by a scanner.

Scan: A program that realizes a service of saving or transferring the image scanned by a scanner to various types of Storages.

Fax: A program that realizes a service of transmitting images scanned by a scanner through a telephone line, or saving in a storage or printing images received through a telephone line.

Print: A program that realizes a service of printing images saved in Storage.

Box: A program that realizes a service of managing images saved in Storage.

Contacts: A program that realizes services related to destinations such as transfer and transmission.

External Applications companion (ExtC): A program that realizes unified behavior by matching behaviors with Applications implemented outside the Framework definition.

Facilities

Fault: A program that feeds back to the user, the state of a fault (error) occurring in the system.

Alert: A program that notifies information that requires a user response generated in the system regardless of the screen display state, and obtains the user response.

System: A program that makes a notification of user interface events which have system-widely occurred such as power saving transition or recovery and automatic logout.

Config.: A program that realizes a mechanism that allows the user to set up a system setting machine such as a network address.

Home: A program that provides a user interface for synchronously switching the screen of Applications according to a user's instruction.

UC: A program that provides a user interface and a mechanism for generating and destroying the user's context.

Banner: A program that presents a notification message generated in a system synchronized with the screen display state.

Jobs: A program that monitors the state of a job, notifies job generation in synchronization with the screen display state, and displays the list according to the instruction of the user.

Framework

WM: Window Manager, and displays or hides, and generates or discards the Applications window.

Communication Manager (CM): A program that realizes a mechanism of cooperation between Applications.

Lifecycle Manager (LM): A program that defines the basic behaviors of Applications and controls boot and realization, termination of services.

Widgets: A program that provides common UI parts for Applications to realize the user interface.

Next, the Device Control, the Runtime, and the utility of the device service layer 32 each include the following.

Device Control

Image Input Terminal Manager (IITM): A program that controls the image input scanner.

Image Output Terminal Manager (IOTM): A program that controls page printer and finishers.

Image Processing Manager (IPM): A program that controls the image processing accelerator.

Device Control Manager (DCM): A program that controls system devices.

Runtime

Principal Authority (PA): A program that identifies user individuals and manages user attributes.

Authenticator (AuthN): A program that authenticates user individuals using mechanisms inside and/or outside the system.

Account Utility (AU): A program that manages account information related to the use of services such as the number of print pages.

Audit: A program that stores the behavior of the system associated with the use and provision of services in time series, and provides the information stored.

Fault Manager (FM): A program that manages the fault (error) state of the system and controls notification and elimination of the state.

Document Manager (DM): A program that provides a structure for bundling multiple images and provides operations as one set (document).

Storage Manager (SM): A program that provides a function to group plural documents and jobs.

Boot Manager (BM): A program that provides a mechanism for activating and terminating the system, and provides functions for activating, terminating, and restarting the system.

Power Manager (PM): A program that monitors the power state of the system and integrates power control between modules.

Device Manager (DevM): A program that controls the processing order, such as queuing of the function usage of the module of Device Control.

Job Manager (JM): A program that provides a traceability function of behaviors between modules in the system.

Timer Manager (TM): A program that provides functions of various alarm timers and interval timers, system clock.

Utility

IDC: A program that realizes a complex service in which the functions of modules of Runtime are combined.

Print Service (PS) is a program that receives a print request, or the like from a network or the like, and realizes a print service, or the like.

Document Transfer (DT): A program that transfers large-scale data such as documents.

Messaging Service (Msg.): A program that transmits messages such as an e-mail, based on events in the system.

Further, the Communication, Storage, Trusties, and Base System of the base layer 34 each include the following.

Communication

Name Service (NS): A program that associates a name designated from the presentation layer 30 with a service in the device service layer.

Connection (Conn.): A program that manages connections between layers, and absorbs differences in programming languages.

Machine Access Control (MAC): A program that identifies the operating environment of the presentation layer 30 and controls the accessible area.

Redirector (RD): A program that determines a proper connection between the layers.

Storage

Virtual File System (VFS): A program that provides virtual file system functions.

Database (DB): Provides the function of relational database.

Key Value Store (KVS): Provides the function of a simple database managing associative arrays.

Shared Memory (ShM): Provides a mechanism for memory sharing in a case where high-speed communication is required.

Trusties

Mandatory Access Control List (MACL): A program that provides a fixed access control list necessary for a system operation.

Policy: A program that manages permission and denial of system resources and actions, which are commonly referred to as Access Policy Set.

Role: An identifier indicating the context intent of the user's instruction, and a program that associates the identifier with an Access Policy.

Groups: A mechanism for hierarchically managing Role.

Base System

Virtual Memory (VM): A management mechanism of a storage area including auxiliary storage such as a main memory and a file system.

File System (FS): an access interface to an apparatus including an I/O space.

Process (Procs.): A program that manages execution contexts such as processes and threads.

Inter Process Communication (IPC): A program that realizes communication between processes and threads in a range where processors are shared.

These configurations correspond to the case of a multi-function machine that implements multiple functions such as scan, fax, and copy, and become more simple, for example, in the case of copy dedicated machines or printer dedicated machines.

Figure 5:
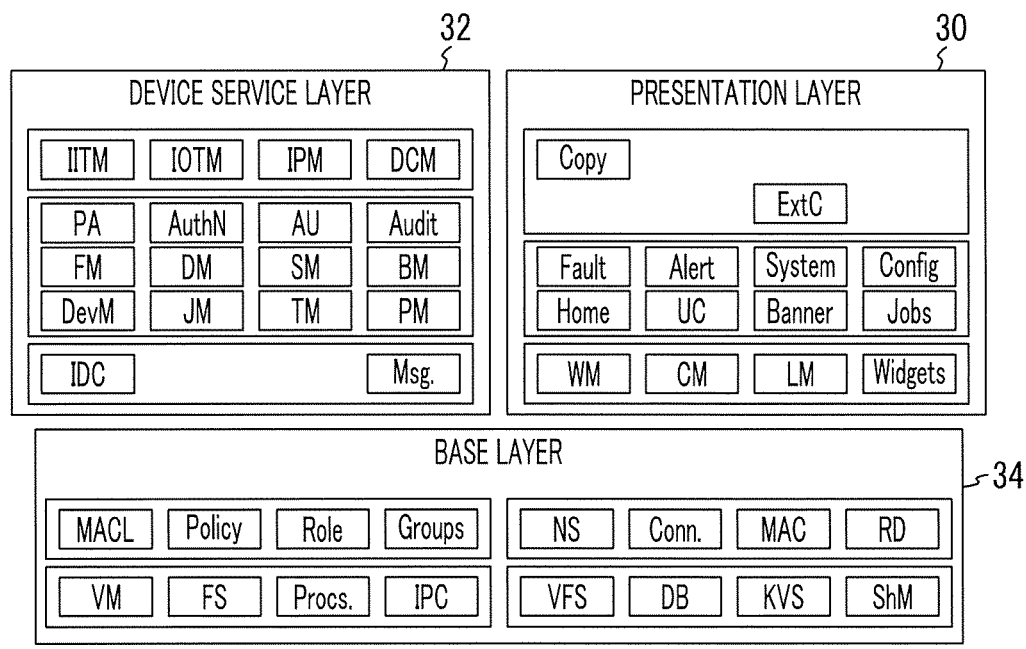
FIG. 5 is a detailed explanatory diagram of a copy dedicated machine.

FIG. 5 shows a configuration of an image forming apparatus which is a copy dedicated machine. Compared with FIG. 4, Scan, Fax, Print, Box, and Contacts are not present in the presentation layer 30, and PS and DT are not present in the device service layer 32.

Figure 6:
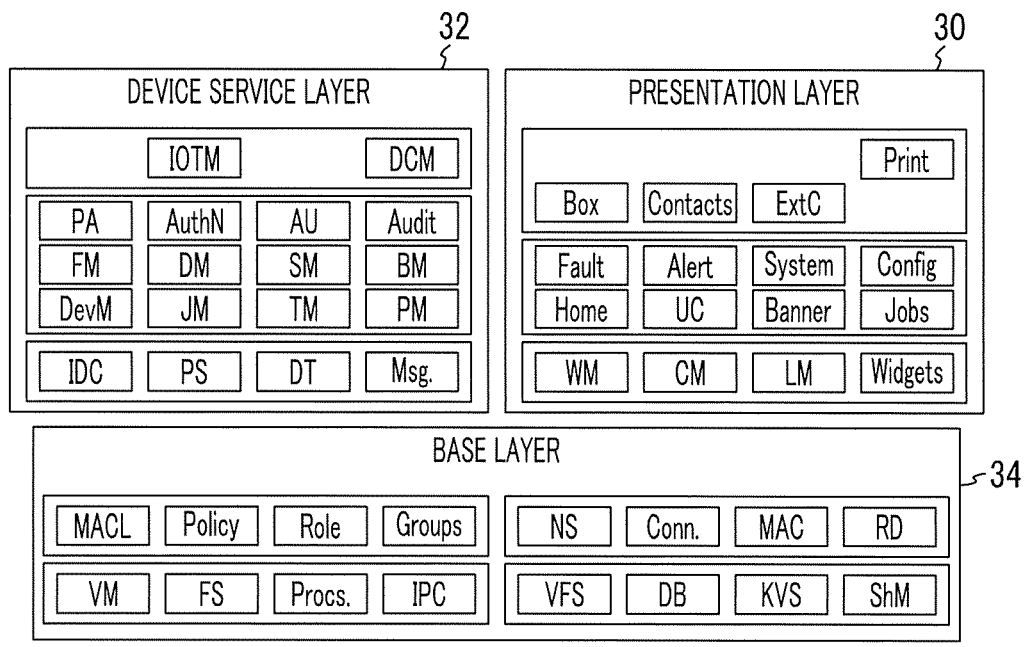
FIG. 6 is a detailed explanatory diagram of a printer dedicated machine.

Further, FIG. 6 shows a configuration of an image forming apparatus which is a printer dedicated machine. Compared with FIG. 4, Copy, Scan, and Fax are not present in the presentation layer 30, and IITM and IPM are not present in the device service layer 32.

As described above, in the present exemplary embodiment, since the system is logically divided into the presentation layer 30, the device service layer 32, and the base layer 34, the image forming apparatus 12 can be physically divided according thereto, and for example, can be physically divided into the body part of the image forming apparatus 12 that implements the device service layer 32 and the base layer 34, and the operation part of the image forming apparatus 12 that implements the presentation layer 30 and provides the user interface.

Figure 7:
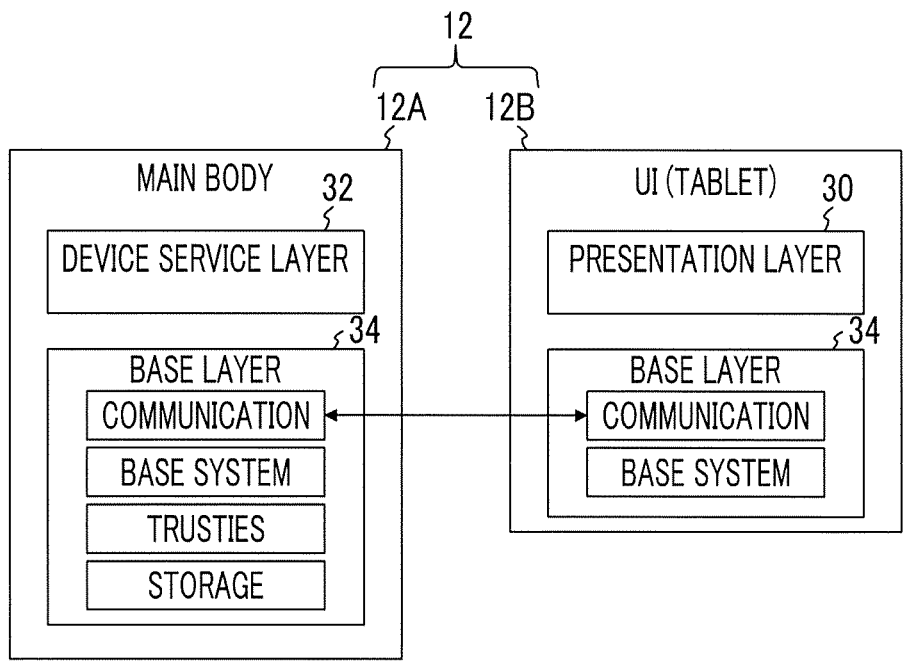
FIG. 7 is a functional block diagram of an image forming apparatus according to another exemplary embodiment.

FIG. 7 shows a configuration in a case where the image forming apparatus 12 is divided into two parts. The image forming apparatus 12 includes a body 12A and a UI terminal 12B. The body 12A implements the device service layer 32 and the base layer 34. On the other hand, the UI terminal 12B implements a part of the presentation layer 30 and the base layer 34.

Specifically, the UI terminal 12B is a tablet, a smartphone, or the like, and provides an operation screen for operating the body 12A to the user. That is, the UI terminal 12B functions as the operation unit 26 in FIG. 1. The operation screen is provided by the presentation layer 30. The UI terminal 12B includes one or plural CPUs, a memory, an input/output interface, a communication interface, and a touch panel which is an operation screen, and the program memory stores various programs constituting the presentation layer 30 and programs constituting a part of the base layer 34. One or plural CPUs execute the programs of the presentation layer 30 and the programs of the base layer 34 stored in the program memory.

A part of the base layer 34 implemented by the UI terminal 12B is specifically the Communication and the Base System, and the job execution command is transmitted and received between the Communication of the base layer 34 of the UI terminal 12B and the Communication of the base layer of the body 12A through the communication unit.

In FIG. 7, a part of the base layer 34 is implemented on the UI terminal 12B, but this is not necessarily indispensable, and only the presentation layer 30 may be implemented on the UI terminal 12B.

Figure 8:
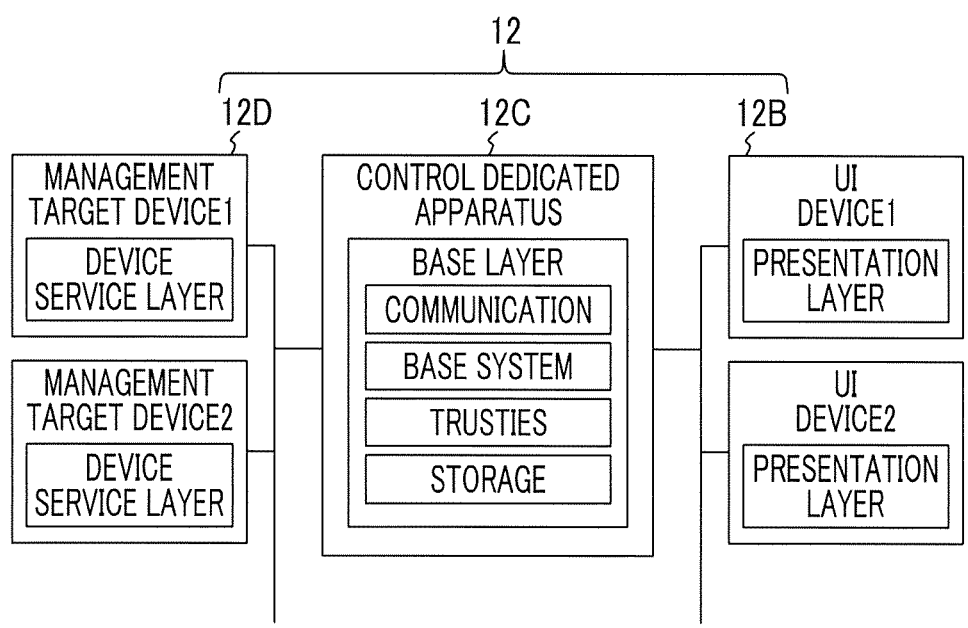
FIG. 8 is a functional block diagram of an image forming apparatus according to still another exemplary embodiment.

FIG. 8 shows a configuration in the case where the image forming apparatus 12 is physically divided into three parts. The image forming apparatus 12 includes a UI terminal 12B, a control dedicated apparatus 12C, and a management target device 12D. The UI terminal 12B implements the presentation layer 30 as described above. The UI terminal 12B includes one or plural CPUs, a memory, an input/output interface, a communication interface, and a touch panel which is an operation screen, and the program memory stores various programs constituting the presentation layer 30. One or plural CPUs execute the programs of the presentation layer 30 stored in the program memory. The control dedicated apparatus 12C implements the base layer 34. The control dedicated apparatus 12C functions as a first apparatus, and includes one or plural CPUs, a memory, and a communication interface. Various programs constituting the base layer 34 are stored in the program memory. One or plural CPUs execute the programs of the base layer 34 stored in the program memory. The management target device 12D implements the device service layer 32. The management target device 12D functions as a second apparatus, and includes one or plural CPUs, a memory, and a communication interface, and various programs constituting the device service layer 32 are stored in the program memory. One or plural CPUs execute the programs of the device service layer 32 stored in the program memory.

Plural UI terminals 12B and plural management target devices 12D may be present. The UI terminal 12B and the control dedicated apparatus 12C, and the control dedicated apparatus 12C and the management target device 12D are connected so as to be able to exchange data by communication unit.

Next, data transmission and reception between the presentation layer 30, the device service layer 32, and the base layer 34 will be described by using the flow of processes such as turn power on→display an activation screen→update the activation screen→display a home screen, as an example.

Figure 9:
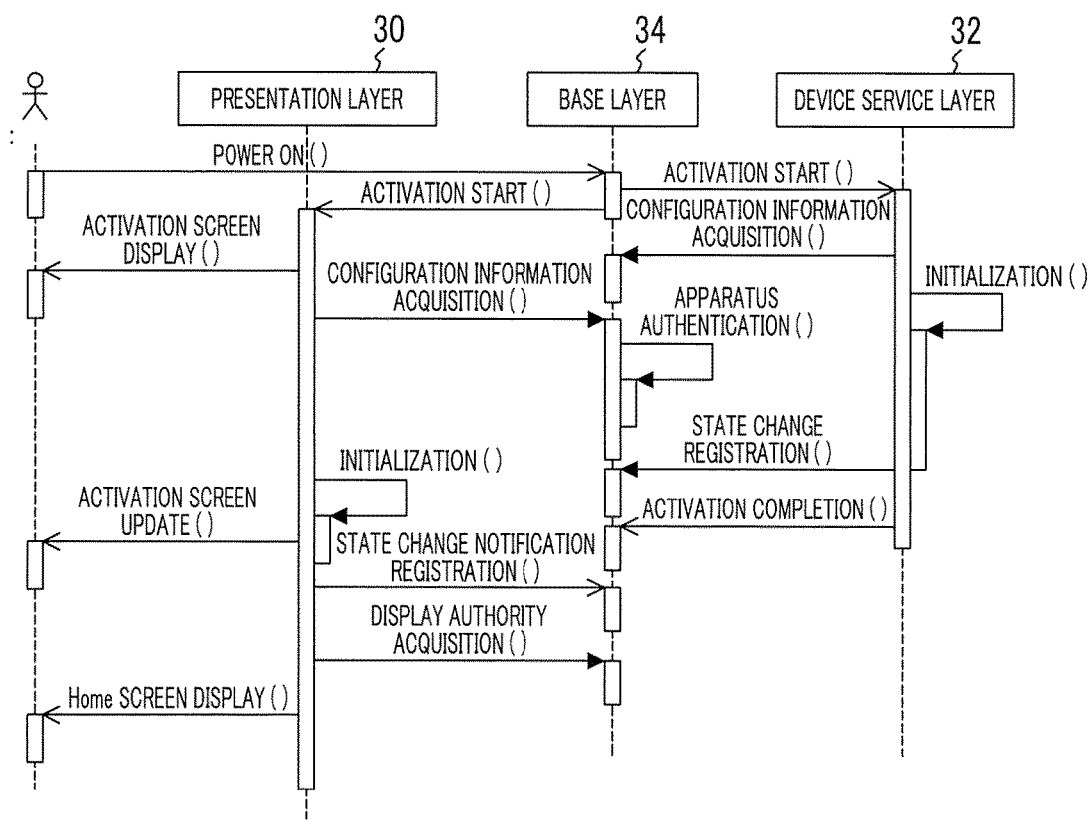

FIG. 9 shows a sequence diagram among the presentation layer 30, the device service layer 32, and the base layer 34.

When the user turns on the power by operating the power button of the image forming apparatus 12, a power-on command is supplied to the base layer 34. The base layer 34 transmits an activation starting command to the device service layer 32, and also transmits the activation starting command to the presentation layer 30.

Upon receiving the activation starting command, the presentation layer 30 displays an splash screen, and provides the splash screen to the user. In addition, the presentation layer 30 transmits a configuration information acquisition request to the base layer 34 to receive the configuration information. In addition, the presentation layer 30 executes an initialization process, and when the initialization process is completed, the presentation layer 30 updates the activation screen and provides the updated activation screen to the user. Further, when the initialization process is completed, the presentation layer 30 transmits a state change notification registration request to the base layer 34. Furthermore, when a display authority acquisition request is transmitted to the base layer 34 and a display authority is acquired, a home screen is displayed and provided to the user.

On the other hand, upon receiving the activation starting command, the device service layer 32 transmits a configuration information acquisition request to the base layer 34, and receives configuration information. The device service layer also executes a processing process similarly to the presentation layer 30, and when the initialization process is completed, the device service layer 32 transmits a state change notification registration request to the base layer 34. Furthermore, the base layer 34 is notified of the activation completion.

In this way, the presentation layer 30 executes the activation screen display, the activation screen update, and the home screen display to provide the screens to the user, and the device service layer 32 executes a process of initializing a device in response to the activation starting command to register the device to the base layer 34, and transmits an activation completion notification to the base layer 34 when activation is completed. The base layer 34 makes the presentation layer 30 and the device service layer 32 cooperate with each other, and transmits an activation starting command to the device service layer 32 in response to the activation starting command from the presentation layer 30.

Figure 10:
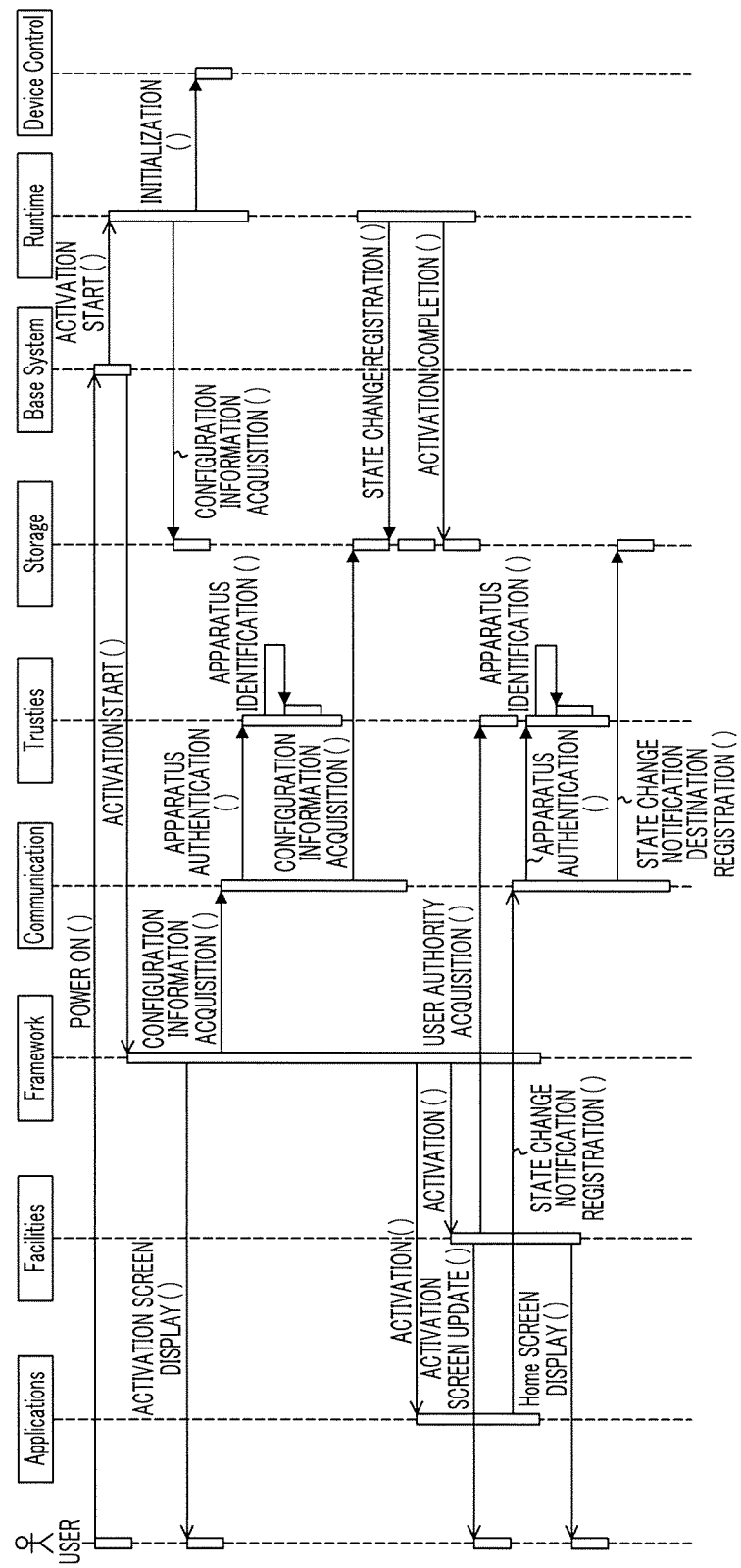

FIG. 10 shows more details of the sequence diagram shown in FIG. 9. There are processes of Applications, Facilities, and Framework as the presentation layer 30, processes of Communication, Trusties, Storage, and Base System as the base layer 34, and processes of Runtime and Device Control as the device service layer 32.

When the user operates the power button, a power-on command is supplied to the Base System. The Base System transmits an activation starting command to Runtime, and also transmits an activation starting command to the Framework.

The Framework displays an activation screen and provides it to the user. Further, the framework transmits a configuration information acquisition request to the Communication. The Communication requests the Trusties for apparatus authentication, and the Trusties performs a apparatus type process. In addition, the Communication transmits a configuration information acquisition request to the Storage. The configuration information returned from the Storage is provided to the Framework through the Communication.

In addition, the Framework requests the Applications and the Facilities for activation. Upon receiving an activation command, the Applications executes the initialization process, and when the initialization process is completed, the Applications requests the Communication for the state change notification registration. Further, upon receiving the activation command, the Facilities updates and displays the activation screen and transmits a user authority acquisition request to the Trusties. Furthermore, the Facilities displays a home screen.

Upon receiving the state change notification registration request from the Applications, the Communication requests the Trusties for apparatus authentication, and the Trusties executes an apparatus identification process. In addition, the Communication transmits a state change notification destination registration request to the Storage.

On the other hand, upon receiving the activation starting command from the Base System, the Runtime transmits a configuration information acquisition request to the Storage, and transmits an initialization command to the Device Control. Upon receiving the initialization command, the Device Control executes the initialization process. When the initialization process of the Device Control is completed, the Runtime requests the Storage for the state change registration, and notifies the Storage of the activation completion.

As described above, the home screen is displayed from the power-on state, and the user logs in on the home screen, selects a necessary service, and instructs the execution of the job.

Next, for data transmission and reception among the presentation layer 30, the device service layer 32, and the base layer 34, explanation will be given using the flow of processes of start login→input information→execute login-→select copy from a service list→set copy→start copy (display a progress screen) as an example.

Figure 11:
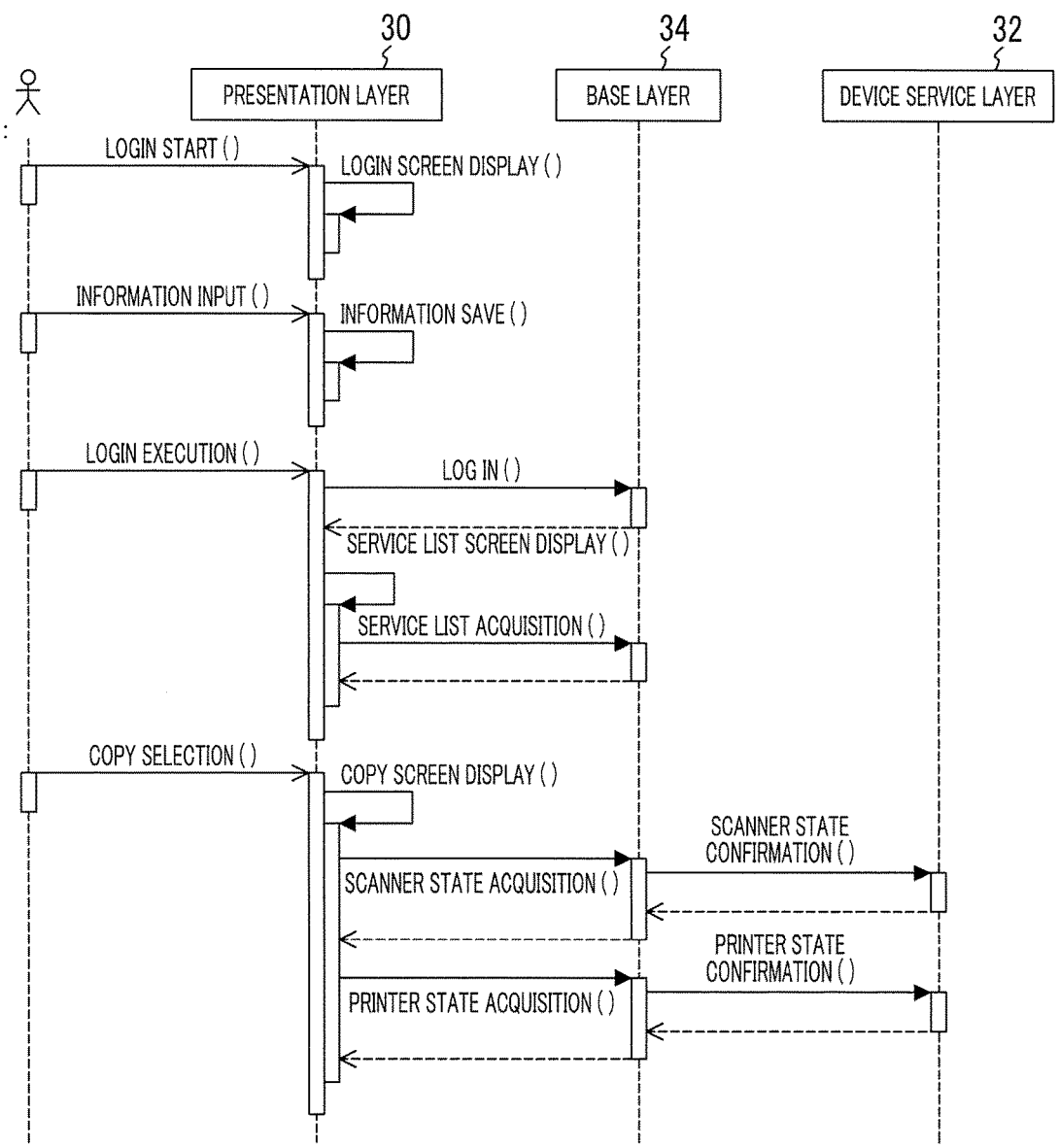
FIG. 11 is a sequence diagram (part 1) after starting login.
Figure 12:
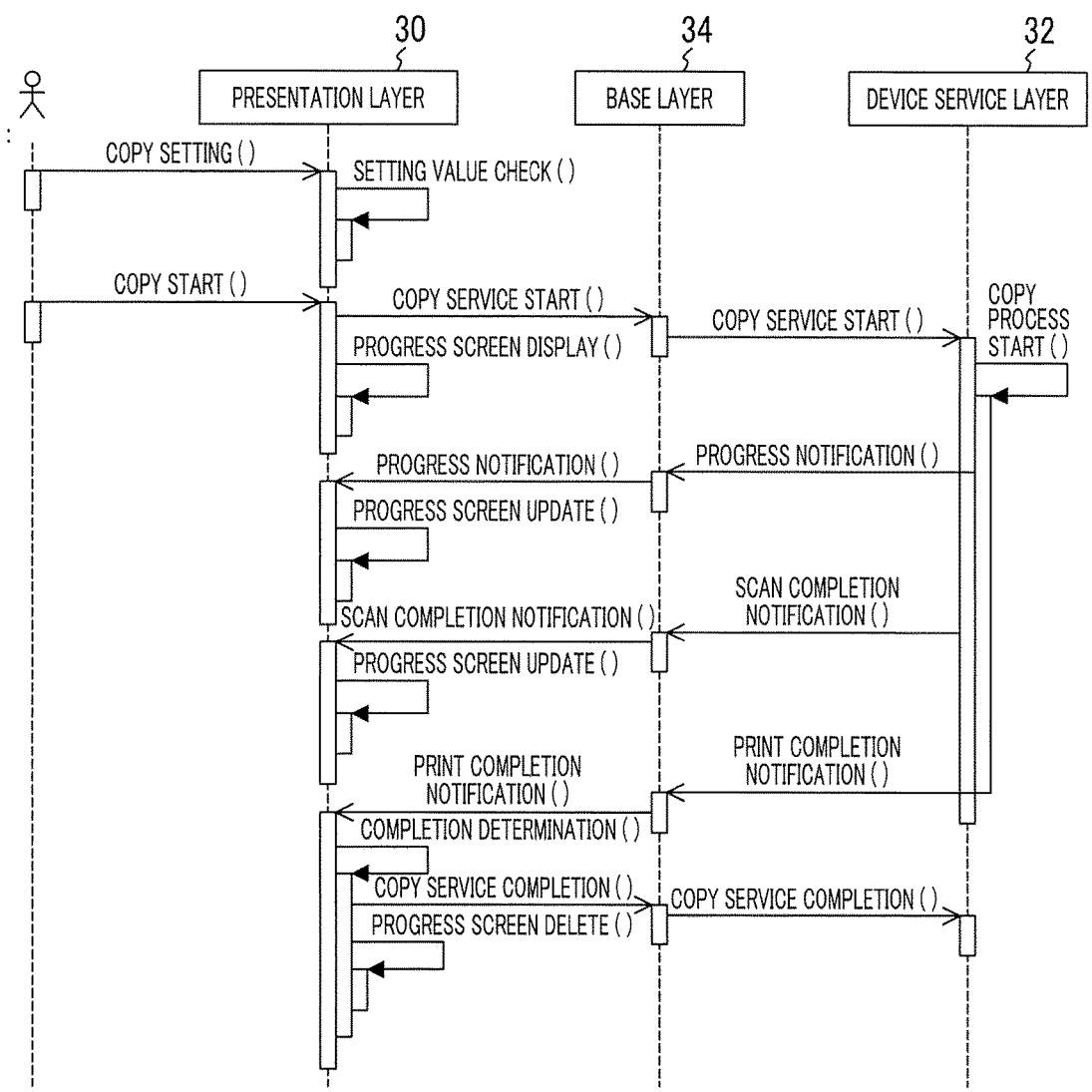
FIG. 12 is a sequence diagram (part 2) after starting login.
Figure 13:
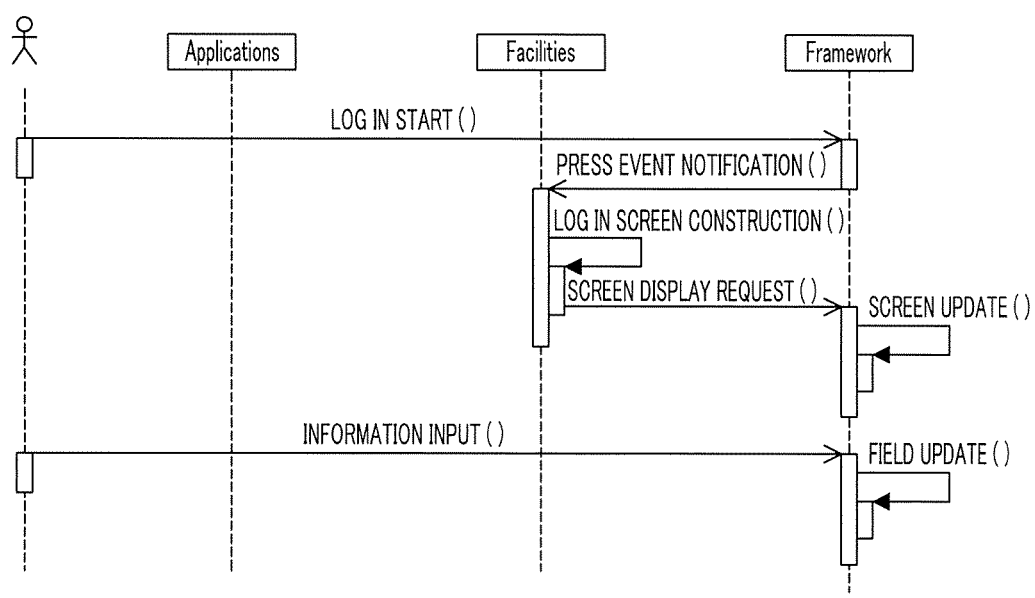
FIG. 13 is a detailed sequence diagram (part 1) after starting login.
Figure 14:
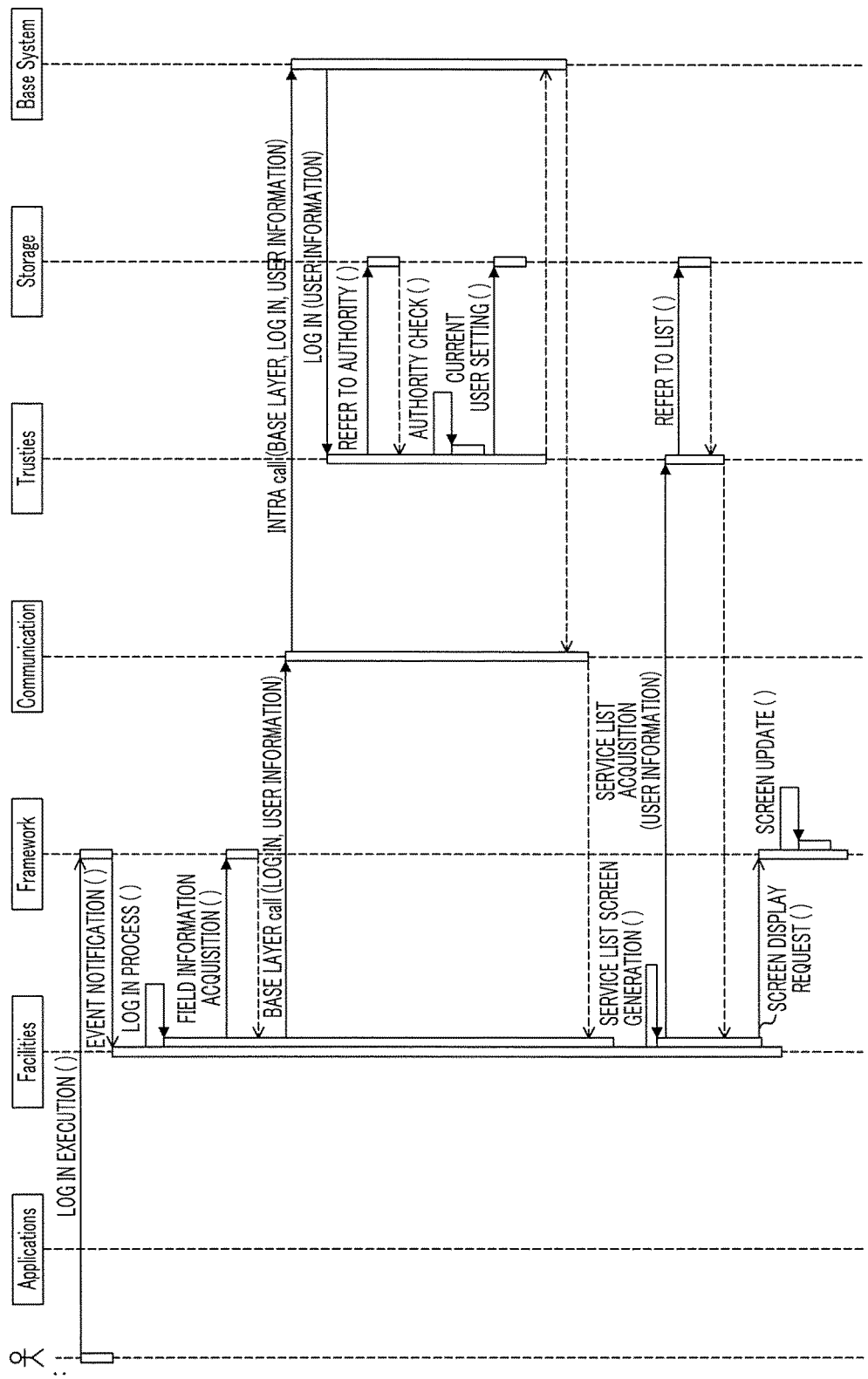
FIG. 14 is a detailed sequence diagram (part 2) after starting login.
Figure 15:
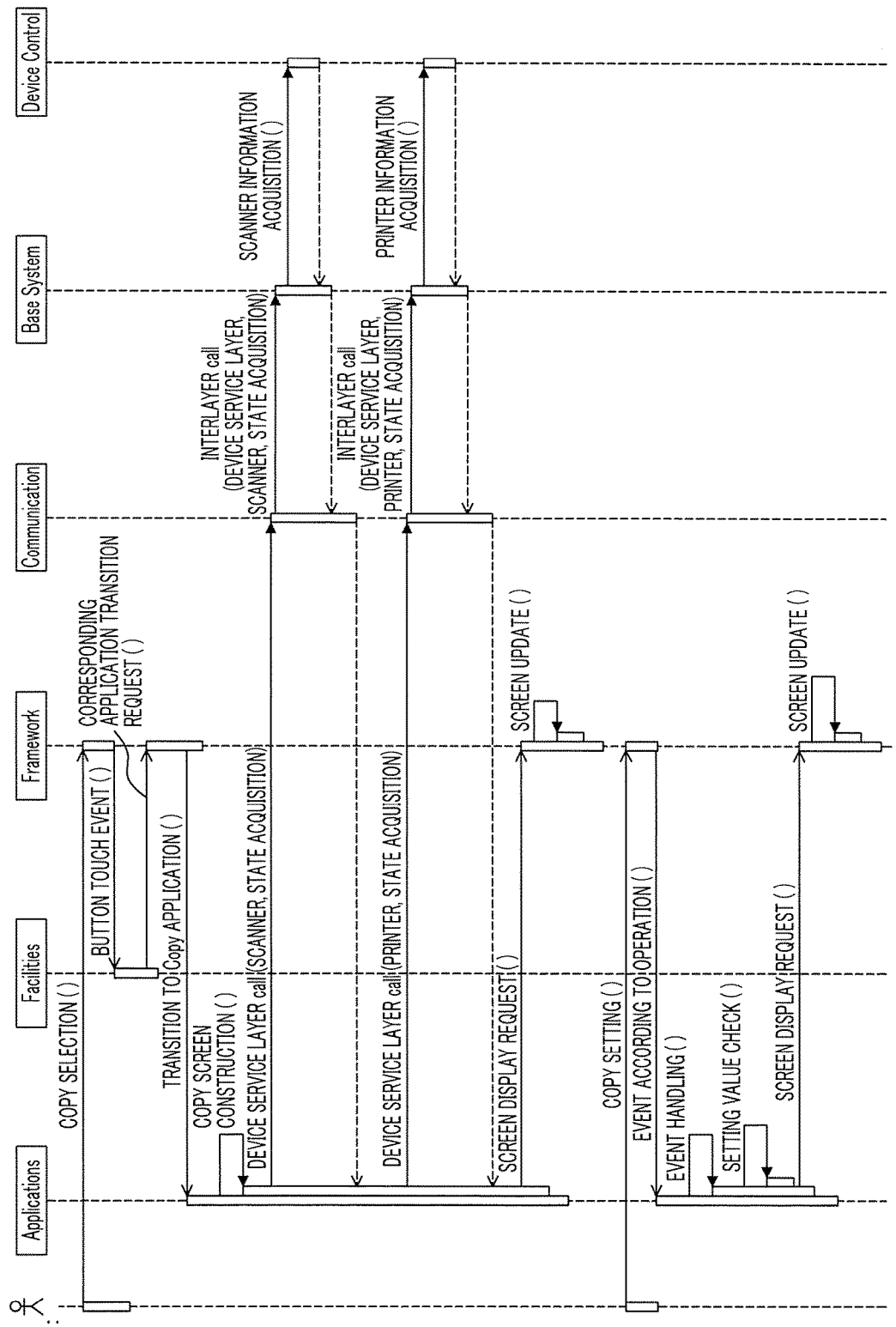
FIG. 15 is a detailed sequence diagram (part 3) after starting login.
Figure 16:
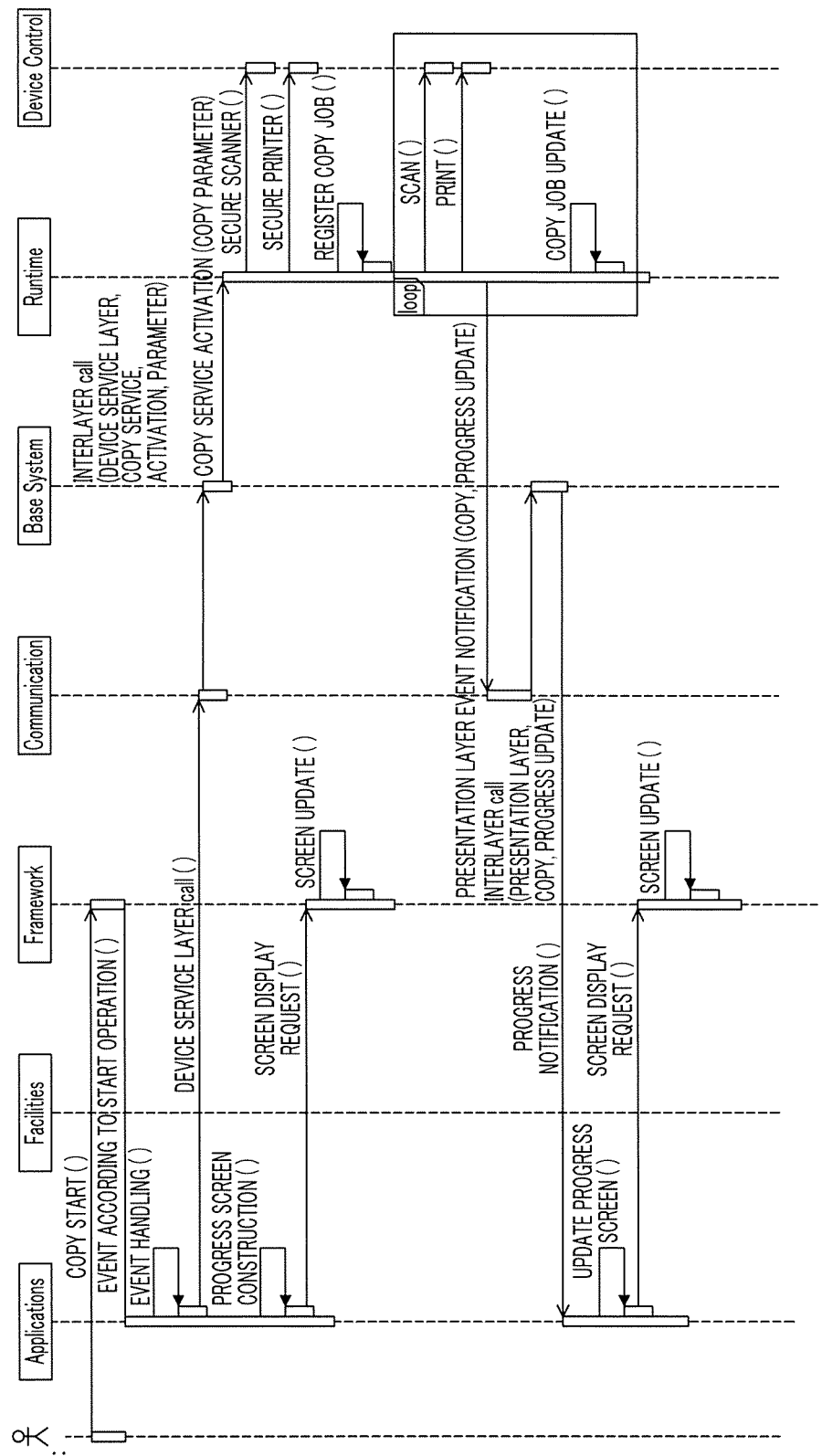
FIG. 16 is a detailed sequence diagram (part 4) after starting login.
Figure 17:
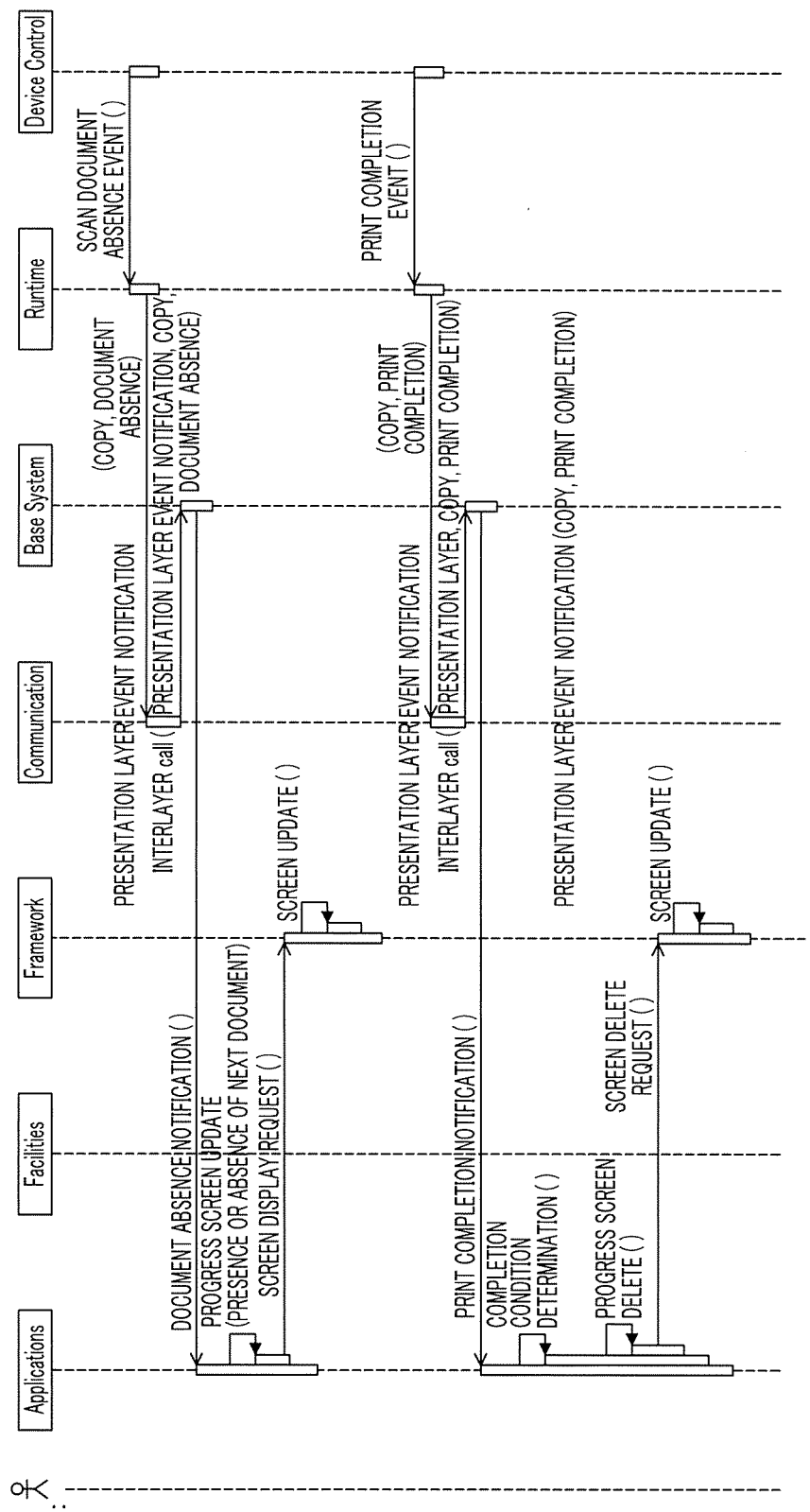
FIG. 17 is a detailed sequence diagram (part 5) after starting login.

FIGS. 11 and 12 show sequence diagrams among the presentation layer 30, the device service layer 32, and the base layer 34.

In FIG. 11, when the user starts login by operating the login button displayed on, for example, the home screen, the presentation layer 30 displays a login screen. When the user inputs necessary information, for example, an ID and a password on the login screen, the presentation layer 30 saves the input information, and when the user executes the login, the presentation layer 30 request the base layer 34 for login.

The base layer 34 executes a login process, and makes a notification to the presentation layer 30 when authentication is completed. The presentation layer 30 displays the service list screen, requests the base layer 34 for information on the user who logs in, and obtains the information. The presentation layer 30 displays a service list screen corresponding to the users who log in.

When the user selects copy using the service list screen, the presentation layer 30 displays a copy screen, and transmits a scanner state acquisition request and a printer state acquisition request to the base layer 34. In response to this request, the base layer 34 transmits a scanner state confirmation request and a printer state confirmation request to the device service layer 32. The base layer 34 receives a response from the device service layer 32 and returns the response to the presentation layer 30.

In FIG. 12, when the user sets the number of copies, paper, or the like, the presentation layer 30 executes a process of checking the set value. When the user instructs the start of copy, the presentation layer 30 requests the base layer 34 to start the copy service, and the base layer 34 requests the device service layer 32 to start the copy service. The device service layer 32 executes a copy process in response to this request. Meanwhile, the device service layer 32 notifies the base layer 34 of the progress status, and the base layer 34 notifies the presentation layer 30 of the received progress status. The presentation layer 30 displays the progress status on the screen, and appropriately updates the screen using the received notification.

When the scan is completed, the device service layer 32 notifies the base layer 34 of the scan completion, and the base layer 34 notifies the presentation layer 30 of the received scan completion. Further, when the printing is completed, the device service layer 32 notifies the base layer 34 of the print completion, and the base layer 34 notifies the presentation layer 30 of the received print completion. Upon receiving the scan completion notification and the print completion notification, the presentation layer 30 executes a completion determination process, and notifies the base layer 34 of the copy service completion. Further, the progress screen is deleted. Upon receiving the copy service completion notification, the base layer 34 notifies the device service layer 32 of the completion of the copy service.

In this manner, when the user instructs the start of copy, the presentation layer 30 notifies the base layer 34 of the copy service start and displays the progress screen, the base layer 34 notifies the device service layer 32 of the copy service start in response to the copy service start notification from the presentation layer 30, the device service layer 32 starts the copy process in response to the notification from the base layer 34 and notifies the base layer 34 of the progress status.

FIGS. 13 to 17 show a more detailed sequence diagram.

When the user logs in, the Framework notifies the Facilities of the event, and the Facilities notifies the Communication of the login information. The Communication notifies the Base System of the login information, and the Base System notifies the Trusties of the login information. The Trusties checks the authority by referring to the authority in the Storage, registers the current user in the Storage, and returns this fact to the Base System. The Base System notifies the Communication that it is a normal user and that the login is performed normally, and the Communication notifies the Facilities of the fact. The Facilities receives the notification to generate a service list screen, and requests the Framework to display the generated screen.

When the user selects copy, the Framework makes a notification to the copy application among the Applications, and the copy application calls the device service layer 32 for Communication, and requests for acquisition of the states of the scanner and the printer. The Communication transmits the call to the Base System in response to the call of the device service layer 32, and the Base System requests the Device Control to acquire scanner information and acquire printer information. Upon acquiring the scanner information and the printer information from the Device Control, the Base System returns the acquired information to the Communication, and the Communication returns the received information to the copy application.

When the user instructs the start of copy, the copy application calls the device service layer 32 for Communication, and the Communication calls the Base System. The base system instructs the Runtime to start the copy service, and the Runtime requests the Device Control to secure the scanner and secure the printer, and executes the copy job registration process. The Runtime instructs the Device Control to perform scan and print, and notifies the copy application of the progress through the Communication and the Base System. The copy application updates the progress screen, requests the Framework to display the screen, and the Framework updates and displays the progress screen.

When scan and print are completed, the Device Control informs the Runtime of each completion thereof, and the Runtime notifies the copy application of each completion through the Communication and the Base System. The copy application makes a determination about the completion condition, and upon determining that the copying is completed, the copy application deletes the progress screen and requests the Framework to delete the screen.

In FIGS. 11 to 17, a copy job among jobs is illustrated, but the same applies to other jobs such as scan, fax, and print.

As described above, in the present exemplary embodiment, since the system is divided into three layers: the presentation layer 30, the device service layer 32, and the base layer 34, for example, even in the case of adding or deleting applications, it is sufficient to add or delete the applications in the presentation layer 30. Further, various forms of use such as implementing the presentation layer 30 on the UI terminal 12B so as to be separated from the body 12A are possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a non-transitory computer readable medium storing a program, the program being logically divided into a presentation layer that implements a user interface function of realizing a response from a user, a base layer that authenticates the user according to account information related to a use of a service on a device of the image forming apparatus, wherein the presentation layer displays a service list screen corresponding to the authenticated user acquired from the base layer, a device service layer that controls the device corresponding to the service selected from the service list screen in response to a call from the presentation layer and makes a notification to the presentation layer upon completion of the selected service, wherein the base layer further makes the presentation layer and the device service layer cooperate with each other; and
   a controller that executes the program.

2. The image forming apparatus according to claim 1, wherein the image forming apparatus is divided into
   a terminal having the presentation layer, and
   a main body having the device service layer and the base layer.

3. The image forming apparatus according to claim 2, wherein when power is turned on,
   the presentation layer displays an activation screen and a home screen, and transmits an activation starting command to the base layer,
   the base layer transmits the activation starting command to the device service layer, and
   the device service layer executes an initialization process in response to the activation starting command, and transmits an activation completion notification to the base layer.

4. The image forming apparatus according to claim 3, wherein the presentation layer includes
   Applications,
   Framework that defines behaviors of the Applications and makes the Applications cooperate with each other,
   Facilities that provides a synchronous or asynchronous user interface,
   wherein the device service layer includes
   Device Control that controls a device, and
   Runtime for executing a job, and
   wherein the base layer includes
   Communication that makes the presentation layer and the device service layer cooperate with each other, and
   Base System that provides an operating system.

5. The image forming apparatus according to claim 2, wherein during job execution,
   the presentation layer transmits a job execution start command to the base layer and displays a progress screen,
   the base layer transmits the execution start command to the device service layer, receives a progress notification from the device service layer, and transmits the progress notification to the presentation layer, and the device service layer receives the execution start command from the base layer, executes a job, and transmits a progress status to the base layer.

6. The image forming apparatus according to claim 5, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

7. The image forming apparatus according to claim 2, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

8. The image forming apparatus according to claim 1, wherein the image forming apparatus is divided into a terminal having the presentation layer, a first apparatus having the base layer, and a second apparatus having the device service layer.

9. The image forming apparatus according to claim 8, wherein when power is turned on, the presentation layer displays an activation screen and a home screen, and transmits an activation starting command to the base layer, the base layer transmits the activation starting command to the device service layer, and the device service layer executes an initialization process in response to the activation starting command, and transmits an activation completion notification to the base layer.

10. The image forming apparatus according to claim 9, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

11. The image forming apparatus according to claim 8, wherein during job execution, the presentation layer transmits a job execution start command to the base layer and displays a progress screen, the base layer transmits the execution start command to the device service layer, receives a progress notification from the device service layer, and transmits the progress notification to the presentation layer, and the device service layer receives the execution start command from the base layer, executes a job, and transmits a progress status to the base layer.

12. The image forming apparatus according to claim 11, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

13. The image forming apparatus according to claim 8, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

14. The image forming apparatus according to claim 1, wherein when power is turned on, the presentation layer displays an activation screen and a home screen, and transmits an activation starting command to the base layer, the base layer transmits the activation starting command to the device service layer, and the device service layer executes an initialization process in response to the activation starting command, and transmits an activation completion notification to the base layer.

15. The image forming apparatus according to claim 14, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

16. The image forming apparatus according to claim 1, wherein during job execution, the presentation layer transmits a job execution start command to the base layer and displays a progress screen, the base layer transmits the execution start command to the device service layer, receives a progress notification from the device service layer, and transmits the progress notification to the presentation layer, and the device service layer receives the execution start command from the base layer, executes a job, and transmits a progress status to the base layer.

17. The image forming apparatus according to claim 16, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

18. The image forming apparatus according to claim 1, wherein the presentation layer includes Applications, Framework that defines behaviors of the Applications and makes the Applications cooperate with each other, Facilities that provides a synchronous or asynchronous user interface, wherein the device service layer includes Device Control that controls a device, and Runtime for executing a job, and wherein the base layer includes Communication that makes the presentation layer and the device service layer cooperate with each other, and Base System that provides an operating system.

19. A non-transitory computer readable medium storing a program causing a processor to execute a process for controlling an image forming apparatus, wherein the program is logically divided into a presentation layer that implements a user interface function of realizing a response from a user, a base layer that authenticates the user according to account information related to a use of a service on a device of the image forming apparatus, wherein the presentation layer displays a service list screen corresponding to the authenticated user acquired from the base layer, a device service layer that controls the device corresponding to the service selected from the service list screen in response to a call from the presentation layer and makes a notification to the presentation layer upon completion of the selected service, wherein the base layer further makes the presentation layer and the device service layer cooperate with each other.

* * * * *